United States Patent [19]
Daley

[11] Patent Number: 6,102,474
[45] Date of Patent: Aug. 15, 2000

[54] PICK-UP LOAD BODY WITH LOCKABLE STORAGE COMPARTMENT

[76] Inventor: Wayne Daley, Rte. 1 Box 162, Bassfield, Miss. 39421

[21] Appl. No.: 09/017,020

[22] Filed: Feb. 2, 1998

[51] Int. Cl.[7] .................................................. B60R 11/06
[52] U.S. Cl. ................................. 296/836; 296/37.6
[58] Field of Search ...................... 296/37.6, 76

[56] References Cited

U.S. PATENT DOCUMENTS

| | | | |
|---|---|---|---|
| D. 257,968 | 1/1981 | Rice | D12/156 |
| 2,622,400 | 12/1952 | Greer | 296/76 |
| 3,245,713 | 4/1966 | Ogilvie | 296/37.6 |
| 3,326,595 | 6/1967 | Ogilvie | 296/37.6 |
| 4,135,761 | 1/1979 | Ward | 296/37.6 |
| 4,570,986 | 2/1986 | Sams | 293/117 |
| 4,917,279 | 4/1990 | Brow et al. | 224/42.14 |
| 4,936,624 | 6/1990 | West | 296/37.6 |
| 5,267,776 | 12/1993 | Kalis, Jr. et al. | 296/183 |
| 5,303,969 | 4/1994 | Simnacher | 296/37.6 |
| 5,421,645 | 6/1995 | Young | 296/37.6 |
| 5,567,000 | 10/1996 | Clare | 196/37.6 |
| 5,787,769 | 7/1998 | Clare | 196/37.6 X |
| 5,819,390 | 10/1998 | Clare | 296/37.6 X |
| 5,823,598 | 10/1998 | Clare | 296/37.6 |

*Primary Examiner*—Dennis H. Pedder
*Attorney, Agent, or Firm*—Venable; Norman N. Kunitz

[57] ABSTRACT

A load body for a pick-up truck which comprises: a pair of spaced inner vertically extending side walls affixed to lateral edges of a load bed; respective outer side wall assemblies connected to the respective said inner side walls, with each assembly including a top horizontally extending rail and a rear end wall portion, and being spaced from said associated inner side wall to form a space there between. A compartment is formed on the outer surface of at least one of said inner side walls by outwardly extending front and rear end walls and a bottom wall attached to the at least one outer surface. A hinge pivotally connects an inner edge of the top rail of the outer side wall assembly associated with the at least one inner side wall to an upper edge of the associated inner side wall so that the outer side wall assembly is pivotable between a lowered position, wherein said compartment is closed by the outer side wall assembly with said rear end wall of said outer side wall assembly covering the rear end wall of the compartment, and a raised position of the outer side wall assembly, wherein the compartment is open and accessible. A controllable device is provided for locking each pivotably connected outer side wall assembly when in the lowered position.

7 Claims, 4 Drawing Sheets

PICK-UP LOAD BODY WITH LOCKABLE STORAGE COMPARTMENT

BACKGROUND OF THE INVENTION

The present invention relates to an improved load body for a pick-up truck. More particularly, the present invention relates to a load body for a pick-up truck with liftable fenders and an incorporated lockable storage compartment.

Load bodies for pick-up trucks conventionally include a load bed provided with inner side walls at its lateral edges for retaining a load, and associated outer side walls, i.e., fenders or quarter panels, which are shaped to blend with the overall contour of the vehicle. The outer side walls are joined to the associated inner side walls by a generally horizontal top member or rail and a rear end member, which generally is provided with a tail light to close the space between the inner and outer side walls. In general, this space is a dead space which is not usable other than possibly for running of vehicles.

However, it is known to utilize this space for storage purposes by providing a lower floor member between the inner and outer side walls and by providing the outer side wall with one or more hinged doors. It is also known to actually hinge a portion of the outer sidewall so that it swings downwardly to expose the compartment formed between the inner side wall and a portion of the outer side wall. Such storage compartments are shown for example, in U.S. Pat. Nos. 5,267,773 and 4,135,761. However, in each of these constructions, the actual appearance of the vehicle is changed as a result of the door openings formed within the outer side walls. This change in the appearance of the vehicle has the disadvantage of making it obvious to evan a casual observer of the vehicle that such a storage compartment exists. Thus, this makes the storage compartment more susceptible to breakage and theft, even if the doors are provided with locks.

It is therefore the basic object of the present invention to provide a pick-up truck load body wherein the space between the inner and outer side walls of the load body is utilized for storage purposes without requiring or providing any openings in the outer sidewall, and which is lockable in a manner which is not readily apparent, except possibly upon close inspection.

SUMMARY OF THE INVENTION

The above object is generally achieved according to the present invention by a load body for a pick-up truck which comprises: a pair of spaced inner vertically extending side walls affixed to lateral edges of a load bed; respective outer side wall assemblies connected to the respective inner side walls, with each assembly including a top normally horizontally extending rail and a rear end wall portion, and being spaced from the associated inner side wall to form a space there between; a compartment formed on the outer surface of at least one of the inner side walls by outwardly extending front and rear end walls and a bottom wall attached to the at least one outer surface; a hinge pivotally connecting an inner edge of the top rail of the outer side wall assembly associated with the at least one inner side wall to an upper edge of the associated inner side wall so that the outer side wall assembly is pivotable between a lowered position, wherein the compartment is closed by the outer side wall assembly with the rear end wall of the outer side wall assembly covering another portion of an outer surface of the rear end wall of the compartment, and a raised position of the outer side wall assembly, wherein the compartment is open and accessible; and controllable means for locking each pivotably connected outer side wall assembly when in the lowered position.

As clearly can be appreciated from the above, since the entire outer side wall of the load body is being raised or moved to gain access to the compartment formed between the receptive inner and outer side walls, there is no disruption in the basic contour of the load body, so that it is not readily apparent that such a storage compartment even exists. Preferably, to provide greater security and sealing of the compartment, the pivotable outer side wall assembly additionally has a front end wall which covers at least a portion of the outer surface of the front end wall of the compartment when the outer side wall assembly is in a lowered closed position. Preferably, the pivotable outer side wall assembly is movable between its closed lower position and its raised upper position by a power drive arrangement which is disposed in a portion of the respective compartment and which likewise and simultaneously comprises the locking means for the outer side wall assembly, so that no separate key or apparent lock in the outer side wall assembly is required. For example, the drive unit may be a hydraulic cylinder, with an air cylinder or electric pressurized drive unit therefore which when deactivated in the lowered position will firmly lock the pivotable outer side wall assembly in the lowered position. Similar functions can be achieved by utilizing an electric motor with acceptable gearing connecting same to the inner surface of the outer side wall assembly.

If desired, each of the outer side wall assemblies may be pivotably mounted and lockable in order to provide a storage compartment between each of the pairs of inner and outer side walls of the load body. In any case, the contours of the two outer side walls should be substantially identical and symmetrical in order not to change the symmetry of the load body of the truck or vehicle, due to, for example, an increase in the width of the space between the inner and outer side walls to provide greater depth for the compartment formed there between.

DETAILED DESCRIPTION OF THE PREFERRED EMBODIMENT

Figure 1:
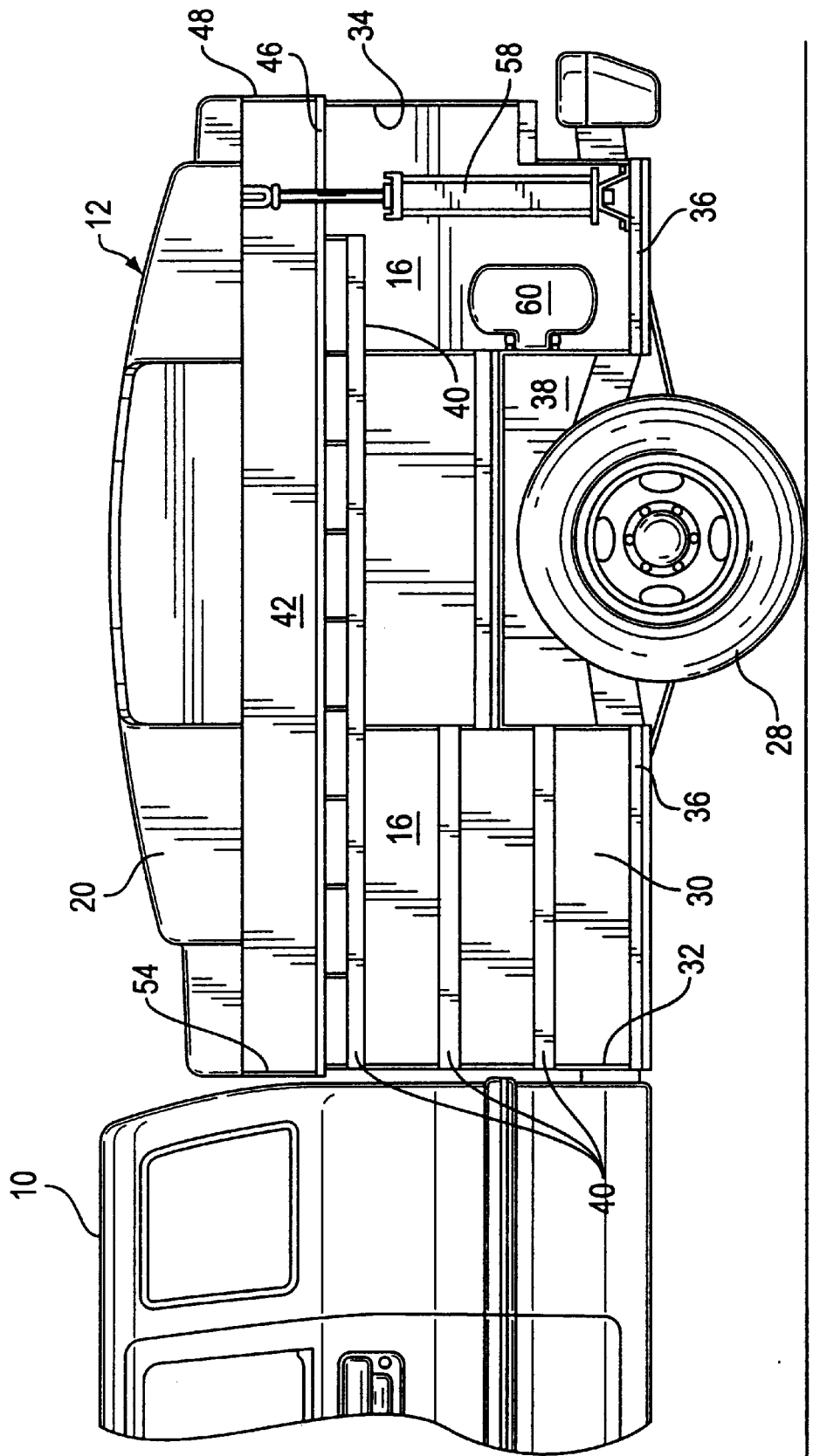
FIG. 1 is a schematic illustration of a pick-up truck provided with a pivotable outer side wall assembly according to the present invention in a raised position.

Turning now to the figures there is shown a pick-up truck having a cab 10 with a load body, generally indicated by the reference numeral 12, at the rear thereof and attached to the truck frame (not shown) in a usual manner. The load body 12 has a load bed 14, generally at the level of the plane 16 shown in FIG. 3, with spaced opposed vertically extending inner side walls 16 and 18 connected to the lateral edges of the load bed 14. Connected to each of the inner walls 16 and 18 is a respective outer side wall assembly 20 and 22. In the normal or conventional position of the outer side wall assembly 20 and 22, as can be seen in FIG. 4, the outer side walls extend generally parallel to but spaced from the respective inner side walls 16 and 18 to provide respective spaces therebetween. According to the present invention, the spaces are to be utilized to form respective compartments 24 and 26 between the respective pairs of inner and outer side walls 16, 20 and 18, 22.

In the illustrated pick-up truck, the spacing between the inner and outer side wall pairs has been extended in width in order to provide additional storage space. For this purpose, and in order to provide proper balance for the vehicle and no substantial lateral overhang of the wheels, the pick-up truck has been illustrated as containing dual rear wheels 28. Moreover, to further increase the available storage space in the vertical distance, the inner side walls 16 and 18 are extended in the downward direction so that they extend substantially below the plane 16 of the load bed 14 for substantially the same distance as the outer side wall assemblies 20 and 22 as in a conventional load body.

In order to form the storage compartment 24, the outer surface 30 of the inner side wall 16 is provided with vertically extending front and rear end wall members 32 and 34 respectively, and with a bottom wall member 36 in order to provide a compartment 24 which is essentially open only in a direction toward the inner surface of the respective outer side wall assembly 20. Moreover, this bottom wall member 36, is shaped so as to provide a closed surface above the conventional wheel well 38. To make the compartment 24 more functional, shelves 40 likewise are shown attached to the outer surface of the inner side wall 16. It should be noted that although the shelves 40 are indicated as being fixed horizontal shelves for the preferred purpose of utilizing same as a tool containing storage compartment, the shelves 40 may have different configurations and some of the shelves may be swingable or be pivotably mounted about vertical axes as so that they can be moved outwardly when the compartment is open. Moreover, the shelves or partitions for the compartment may be differently oriented depending on a different desired use. For example, instead of using the compartment or compartments for storage of tools, it can be used in the normal manner of a trunk for storing luggage or other items, in which case either no partitions or shelves need be provided or, for example, vertically extending partitions may be provided instead of the shelves 40. It should further be noted that the compartment 34 between the inner side wall 18 and the outer side wall assembly 22 may be similarly configured to that described for the compartment 24, or may be differently configured, for example, with no shelves or with vertical partitions, or even may not be utilized as a storage compartment at all. However in the later case, the contour of the outer side wall assembly 22 should be made the same as that of the pivotable outer side wall assembly 6 to maintain vehicle symmetry in which case the outer side wall assembly 22 need not be pivotally connected to the inner wall 18.

In order to be able to cover and/or gain access to the compartment 24, the outer side wall assembly 20 (or 22) is pivotably mounted on and connected to the associated inner side wall 16 (or 18). For this purpose, the upper end of the outer side wall assembly 20 includes a normally generally horizontally extending upper plate or rail member 42, whose width depends on the width of the associated compartment 24, and whose outer free end is connected via a hinge 46 to the upper end of the inner wall 16. The outer side wall assembly 20 additionally has a rear end wall 48, containing, for example, a tail light 50 as shown, which extends over and covers at least a portion of the rearward facing surface of the rear end wall member 34 of the compartment, as is conventional in such load bodies. This tends to seal the compartment 24 in the rearward direction, so that access to the contents are not accessible from the outside, even when the tail gate 52 is not raised. Preferably, the outer side wall assembly 20 additionally has a front end wall 54 which extends adjacent the outer surface of the rear end wall member 32 for the compartment in the lower position of the outer side wall assembly 20 in order to provide a more complete sealed and secured arrangement. It should be noted, however, that it is possible for the outer side wall assembly 20 to simply sealingly engage the outer edge surface of the rear end wall member 32 to provide a seal against the elements. However, such would of course not provide as secure an arrangement. Preferably, the interior of the outer side wall assembly 20 is provided with an interior lid 56 (best shown in FIG. 2) which essentially closes off the shelves 40 when the assembly 20 is in the lowered position to prevent articles on the shelves 40 from moving around and striking the actual interior surface of the compartment.

Figure 2:
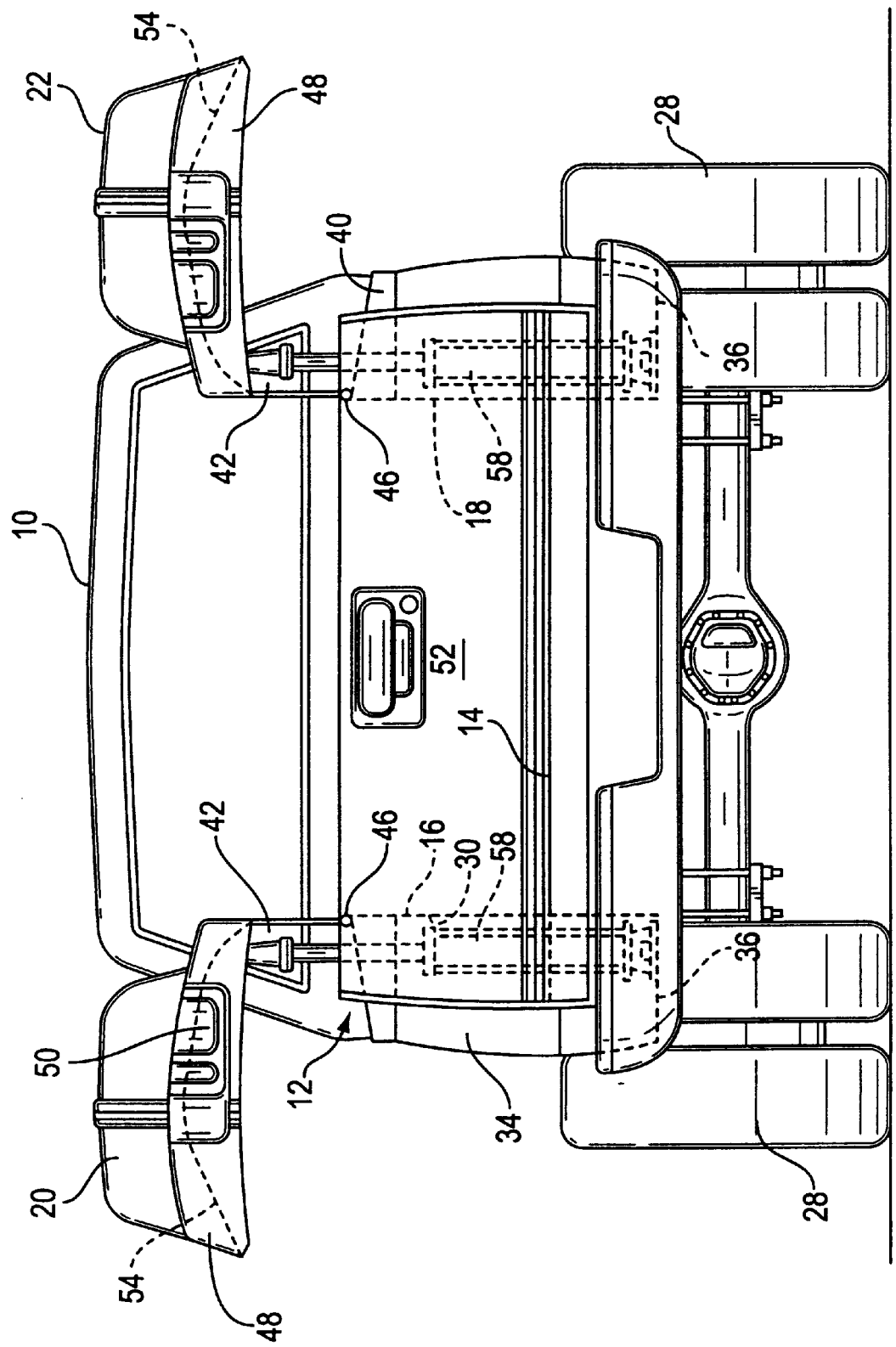
FIG. 2 is a rear view of the pick-up truck of FIG. 1 with both outer side wall assemblies according to the invention in a raised position.
Figure 3:
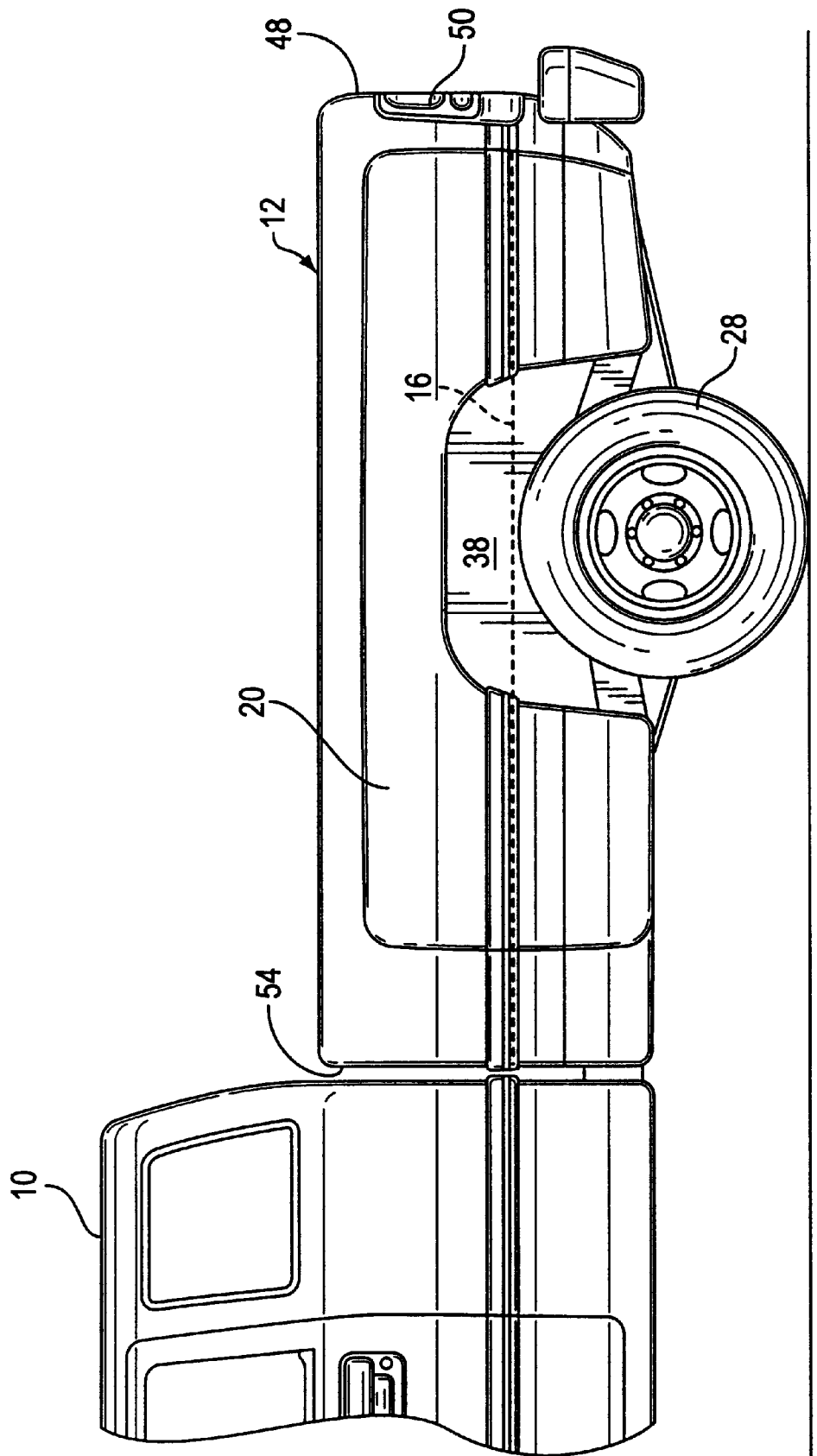
FIG. 3 is a side view of the vehicle of FIG. 1 with the side wall assemblies in a lowered position.
Figure 4:
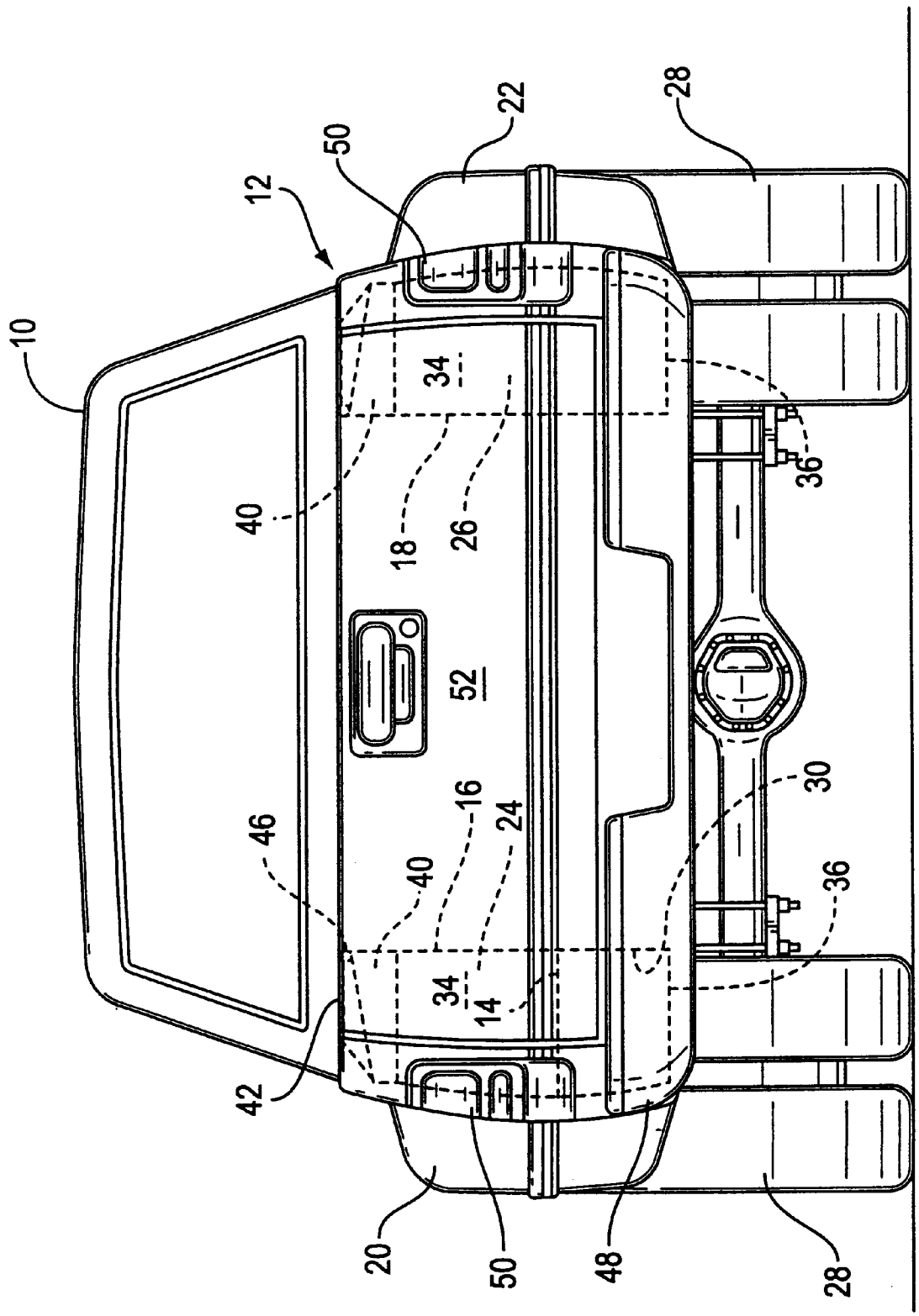
FIG. 4 is a rear view of the vehicle shown in FIG. 3.

Although it is possible, particularly with a small pick-up, to manually raise and lower the outer side wall assemblies 20 and 22, and to maintain same in a raised position by providing either a spring loaded hinge, similar to a trunk hinge, or a manual support strut for maintaining the outer wall assembly 20 in a raised position, preferably, as shown most clearly in FIGS. 1 and 2, a hydraulic arrangement for raising and lowering the outer wall assembly 20, and for maintaining it in the raised opened position as shown in FIGS. 1 and 2 or the closed position as shown in FIGS. 3 and 4, is provided. In the preferred embodiment, this hydraulic arrangement includes a hydraulic cylinder and piston arrangement 58 and a pressure supply 60, with one end of the cylinder being articulated to the bottom wall member 36, and with the free end of the piston being articulated to the inner surface of the outer wall assembly 20. The power for the pressure supply 60 may be provided via the truck engine or via an external source connectable via a pressure hose or cable provided on a swingable or removable rack or reel which preferably is mounted adjacent the piston 58. Upon actuation of this pressure supply source 60, for example, via a switch in the cab 10, the cylinder and piston will tend to pivot the outer wall assembly 20 about the hinge 46 to raise it to the open raised position as shown in FIG. 1 and 2 and maintain same in this open position. Conversely, upon reversing the piston movement, the outer wall assembly 20 will be lowered to the closed position shown in FIGS. 3 and 4. Note that with this arrangement, when the cylinder and piston arrangement 58 has moved the outer wall assembly 20 to the lowered position, the outer wall assembly is locked in the closed position so that no further key arrangement is required. It should be noted, however, that a separate key arrangement may be provided if desired in a conventional manner.

As with the other features described above, a further drive unit may be provided for the outer wall assembly 22 if such a pivotable assembly is provided as shown.

As can easily be appreciated, with the arrangement according to the invention, the load body is provided with additional storage space which is not immediately noticeable by observers since no apparent doors or covers for such a storage compartment can be seen. Consequently, the aesthetic appearance of the vehicle contour is not essentially change except for a possible widening of the vehicle load body, which would not in and of itself alert someone to the presence of a storage compartment in any case. In general, the outer appearance of the truck body is unchanged by the modification thereof according to the invention. Moreover, with the preferred features, a highly secured compartment for storage of tools, luggage and the like, being provided in a conventional pick-up truck load body.

The invention now being fully described, it will be apparent to one of ordinary skill in the art that many changes and modifications can be made thereto without departing from the spirit or scope of the invention as set forth herein.

What is claimed:

1. A load body for a pick-up truck comprising: a pair of spaced inner vertically extending side walls affixed to lateral edges of a load bed and extending over the entire length thereof; a respective outer side wall assembly connected to each of said inner side walls and extending along the entire length of the load bed, with each said assembly including an outer side wall extending over substantially the entire surface area of the respective inner side wall, and below a load bed floor of the pick-up truck, a top horizontally extending rail and a rear end wall portion, with the outer side wall being spaced from said associated inner side wall to form a space there between; a compartment formed on the outer surface of at least one said inner side walls by outwardly extending front and rear end walls and a bottom wall attached to the at least one outer surface; a hinge pivotally connecting an entire inner edge of said top rail of the outer side wall assembly associated with the at least one inner side wall to and along an entire upper edge of said associated inner side wall so that said outer side wall assembly is pivotable between a lowered position, wherein said compartment is closed by said outer wall assembly with said rear end wall portion of said outer side wall assembly completely covering said rear end wall of said compartment, and a raised position of the outer side wall assembly, wherein the compartment is open and accessible: and controllable means for locking each pivotably connected outer side wall assembly when in the lowered closed position and which is not visible from the exterior when the outer side wall assembly is in the lowered closed position.

2. A load body as defined in claim 1 wherein said at least one pivotably connected outer side wall assembly has a front end wall which covers the front end wall of the compartment when in the lowered closed position.

3. A load body as defined in claim 1 wherein said means for locking comprises a drive unit mounted in a portion of said compartment and connected to an inner surface of said at least one outer side wall assembly for, when activated, moving the outer side wall assembly between its raised open and lowered closed positions.

4. A load body as defined in claim 3 wherein said drive unit includes a hydraulic cylinder articulated to said bottom wall of said compartment and to said inner surface of the respective outer side wall assembly to both raise and lower said outer side wall assembly and lock said outer side wall assembly when disposed in a lowered closed position of the outer side wall assembly.

5. A load body as defined in claim 1 wherein each of said outer side wall assemblies is symmetrically contoured.

6. A load body as defined in claim 5 wherein one of said compartments is formed on each of said inner side walls, and each of said outer side wall assemblies is pivotably connected to the upper edge of the associated said inner side wall.

7. A load body as defined in claim 1 wherein: each of said inner and outer side walls and said compartment floor extends below said load bed floor, and a portion of said bottom wall of said compartment defines a wheel well for a respective wheel of a pick-up truck.

* * * * *